United States Patent
Chen

(10) Patent No.: US 10,197,759 B2
(45) Date of Patent: Feb. 5, 2019

(54) ELECTRONIC DEVICE HAVING DUAL-LENS ELEMENT

(71) Applicant: SCIENBIZIP CONSULTING (SHENZHEN) CO., LTD., Shenzhen (CN)

(72) Inventor: Yu-Ping Chen, New Taipei (TW)

(73) Assignee: ScienBiziP Consulting (Shenzhen) Co., Ltd., Shenzhen (CN)

(*) Notice: Subject to any disclaimer, the term of this patent is extended or adjusted under 35 U.S.C. 154(b) by 0 days.

(21) Appl. No.: 15/641,419

(22) Filed: Jul. 5, 2017

(65) Prior Publication Data
US 2018/0364440 A1 Dec. 20, 2018

(30) Foreign Application Priority Data
Jun. 16, 2017 (TW) .............................. 106120193 A

(51) Int. Cl.
*G02B 7/02* (2006.01)
*H04N 13/282* (2018.01)

(52) U.S. Cl.
CPC ............. *G02B 7/021* (2013.01); *G02B 7/023* (2013.01); *H04N 13/282* (2018.05)

(58) Field of Classification Search
CPC ....... G02B 7/021; G02B 7/023; H04N 13/282
See application file for complete search history.

(56) References Cited

U.S. PATENT DOCUMENTS

2017/0064172 A1* 3/2017 Vittu .................... H04N 5/2253

* cited by examiner

Primary Examiner — Joseph P Martinez
(74) Attorney, Agent, or Firm — ScienBiziP, P.C.

(57) ABSTRACT

An electronic device includes a main body and a dual-lens element and the ability of the dual-lens element to capture stereoscopic or 3D images remains notwithstanding changes in orientation of the device. The dual-lens element is rotatable on a surface of the main body and includes a rotating disk, a dual-lens module, a gravity sensor, and a controller. The gravity sensor detects a rotation direction and a rotation angle of the main body when the main body is rotated relative to a horizontal plane and the controller controls the rotating disk to rotate about the rotation angle by way of compensation, thereby maintaining the horizontal aspect of the dual-lens module.

14 Claims, 2 Drawing Sheets

ELECTRONIC DEVICE HAVING DUAL-LENS ELEMENT

FIELD

The subject matter relates to image-capturing, and to an electronic device with a rotatable dual-lens element.

BACKGROUND

Electronic devices can capture three-dimensional (3D) images by dual-lens mechanisms. Thus, communication products with the dual-lens element are popular. However, the 3D image capturing function of the electronic device is limited since the dual-lens mechanism is fixed and unchangeable. The electronic device cannot capture 3D images from all angles.

BRIEF DESCRIPTION OF THE DRAWINGS

Implementations of the present technology will now be described, by way of example only, with reference to the attached figures, wherein.

DETAILED DESCRIPTION

Figure 1:
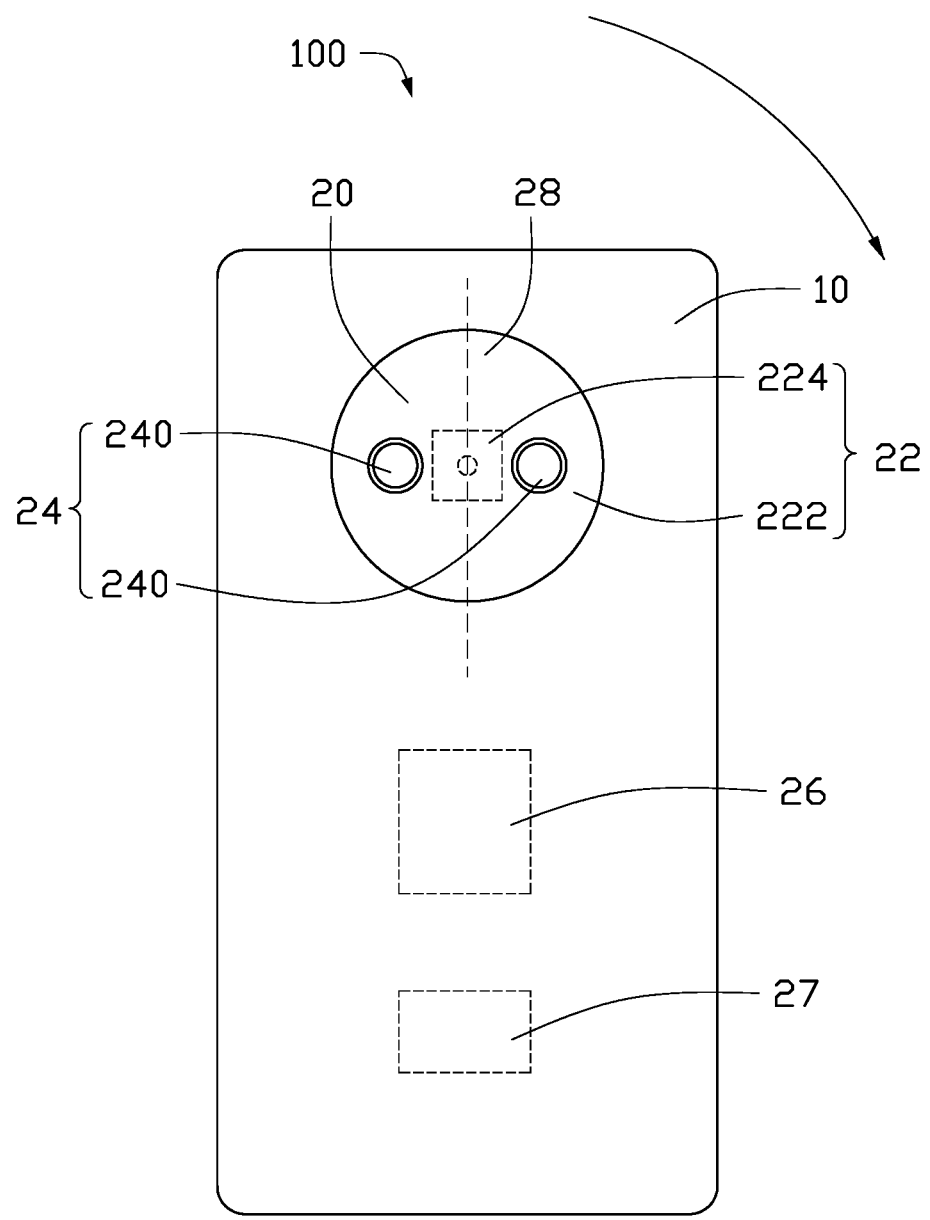
FIG. 1 is a diagram of an exemplary embodiment of an electronic device having a rotatable dual-lens element.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

One definition that applies throughout this disclosure will now be presented.

The term "substantially" is defined to be essentially conforming to the particular dimension, shape, or other feature that the term modifies, such that the component need not be exact. For example, "substantially rectangular" means that the object resembles a rectangle, but can have one or more deviations from a true rectangle.

The term "comprising," when utilized, means "including, but not necessarily limited to"; it specifically indicates open-ended inclusion or membership in the so-described combination, assembly, series, and the like.

An electronic device comprises: a main body; a dual-lens element rotatable on a surface of the main body, the dual-lens element comprising: a rotating disk; and a dual-lens module, the dual-lens module positioned on and rotatable on the rotating disk; and a gravity sensor, the gravity sensor detecting a rotation direction and a rotation angle of the main body when the main body rotates the dual-lens relative to a horizontal plane; and a controller receiving information about the detected rotation direction and the detected rotation angle, and controlling the rotating disk to rotate in an angle identical in degrees of angle and in a reverse direction of the detected rotation angle, thereby the dual-lens module remaining parallel to the horizontal plane.

The horizontal plane is perpendicular to gravity.

The dual-lens module comprises two lenses with the same size and shape, the two lenses are symmetrical to a center axis of the rotating disk.

The rotating disk comprises a disk body and a motor, the dual-lens module and the motor are positioned on opposite surfaces of the rotating disk.

The disk body is circular.

The dual-lens element further comprising a cover, wherein the cover covers the disk body and the dual-lens module.

The cover is made from transparent plastics and glass.

The cover is circular.

The electronic device is a mobile phone.

The mobile phone is cuboid.

Figure 2:
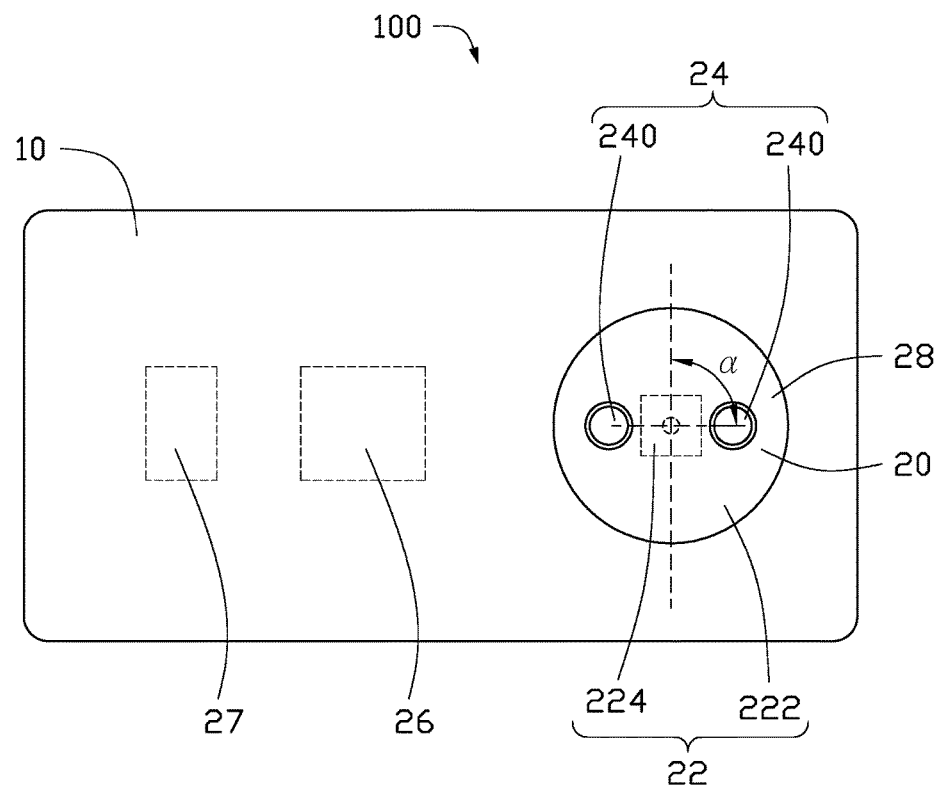
FIG. 2, similar to FIG. 1, is a diagram showing the electronic device in another working state.

FIGS. 1 to 2 illustrate an electronic device 100. The electronic device 100 comprises a main body 10, a dual-lens element 20, a gravity sensor 26, and a controller 27. The dual-lens element 20 is positioned on a surface of the main body 10. The gravity sensor 26 and the controller 27 are received in the main body 10. The electronic device 100 is cuboid. In the exemplary embodiment, the electronic device 100 is a mobile phone. In the other exemplary embodiment, the electronic device 100 can be a tablet computer, an image capturing apparatus, or other.

Referring to the FIG. 1, the FIG. 1 is a diagram of an exemplary embodiment of an electronic device having a rotatable dual-lens element.

The main body 20 is a cuboid with round edges. The dual-lens element 20 is positioned adjacent to an edge of the main body 10 and protrudes from the surface of the main body 10.

The dual-lens element 20 comprises a rotating disk 22, a dual-lens module 24, and a cover 28.

The rotating disk 22 is positioned on the main body 10. The rotating disk 22 comprises a disk body 222 and a motor 224. The motor 224 is positioned on a surface of the disk body 222 near the main body 10. The motor 224 drives the disk body 222 to rotate. In the exemplary embodiment, the disk body 222 is substantially circular.

The dual-lens module 24 is positioned on the disk body 222. The dual-lens module 24 and the motor 224 are located at opposite surfaces of the disk body 222. In the exemplary embodiment, the dual-lens module 24 comprises two lenses 240 having same size and shape. The two lenses 240 are symmetrical with respect to a center axis of the disk body 222.

The cover 28 is positioned above the disk body 222 and the dual-lens module 24, and covers the disk body 222 and the dual-lens module 24. The cover 28 prevents ingress of dust. The shape and the size of the cover 28 is identical to that of the disk body 222. In the exemplary embodiment, the cover 28 is a substantially circular. The cover 28 is made from transparent materials, such as glass and plastic.

The gravity sensor 26 detects a rotation angle α and a rotation direction of the main body 10 when the main body 10 rotates relative to a horizontal plane. The horizontal plane is perpendicular to gravity.

The controller 27 receives information about the rotation direction and the rotation angle α detected by the gravity sensor 26, and controls the motor 224 to rotate the disk body 222 about the same angle by way of compensation.

When the electronic device 100 rotates relative to the horizontal plane, the gravity sensor 26 detects the rotation direction and the rotation angle α of the electronic device 100. The gravity sensor 26 transmits information about the rotation angle α and the rotation direction to the controller 27. The controller 27 controls the motor 224 to drive the disk body 222 to rotate about the same angle α in a reverse direction. Therefore, the two lenses 240 of the dual-lens module 24 can remain on a same horizontal orientation, thereby allowing the electronic device 100 to capture three-dimensional images from different angles.

Referring to FIG. 2, the FIG. 2, similar to the FIG. 1, is a diagram showing the electronic device in another working state.

Referring to FIGS. 1-2, the electronic device 100 changes from a horizontal orientation to a vertical direction. The gravity sensor 26 detects a rotation direction and a rotation angle of 90 degrees of the main body 10, and transmits the rotation direction and the rotation angle to the controller 27. The controller 27 controls the motor 224 to rotate the disk body 222 about 90 degrees, so that the two lenses 240 of the dual-lens module 24 can remain parallel to the horizontal plane (at this time, the two lenses 240 are still symmetrical relative to the center axis of the disk body 222).

The embodiment shown and described above is only an example. Many details are often found in the art such as the other features of the street lamp. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
   a main body;
   a dual-lens element rotatable on a surface of the main body, the dual-lens element comprising:
   a rotating disk; and
   a dual-lens module, the dual-lens module positioned on and rotatable on the rotating disk; and
   a gravity sensor, the gravity sensor detecting a rotation direction and a rotation angle of the main body when the main body rotates the dual-lens relative to a horizontal plane; and
   a controller receiving information about the detected rotation direction and the detected rotation angle, and controlling the rotating disk to rotate in an angle identical in degrees of angle and in a reverse direction of the detected rotation angle, thereby the dual-lens module remaining parallel to the horizontal plane.

2. The electronic device of claim 1, wherein the horizontal plane is perpendicular to gravity.

3. The electronic device of claim 1, wherein the dual-lens module comprises two lenses with the same size and shape, the two lenses are symmetrical to a center axis of the rotating disk.

4. The electronic device of claim 1, wherein the rotating disk comprises a disk body and a motor, the dual-lens module and the motor are positioned on opposite surfaces of the rotating disk.

5. The electronic device of claim 4, wherein the disk body is circular.

6. The electronic device of claim 1, the dual-lens element further comprising a cover, wherein the cover covers the disk body and the dual-lens module.

7. The electronic device of claim 6, wherein the cover is made from transparent plastics and glass.

8. The electronic device of claim 6, wherein the cover is circular.

9. The electronic device of claim 1, wherein the electronic device is a mobile phone.

10. The electronic device of claim 9, wherein the mobile phone is cuboid.

11. The electronic device of claim 1, wherein the electronic device is a tablet computer.

12. The electronic device of claim 11, wherein the tablet computer is cuboid.

13. The electronic device of claim 1, wherein the electronic device is an image capturing apparatus.

14. The electronic device of claim 13, wherein the image capturing apparatus is cuboid.

* * * * *